United States Patent Office 3,732,145
Patented May 8, 1973

3,732,145

PROCESS FOR PRODUCING CITRIC ACID

Isoshi Oomori and Kiyoyuki Suzue, Hitachi, Japan, assignors to Hitachi Chemical Company, Ltd., Tokyo, Japan No Drawing. Filed Oct. 28, 1970, Ser. No. 84,942
Claims priority, application Japan, Oct. 29, 1969, 44/85,992
Int. Cl. C12d *1/04*
U.S. Cl. 195—30 18 Claims

ABSTRACT OF THE DISCLOSURE

Citric acid is produced by culturing a microorganism belonging to the genus Aerobacter, Pseudomonas, Micrococcus or Bacillus in a medium containing L-isocitric acid and/or isocitric acid lactone as a main carbon source or culturing said microorganism in a medium containing L-isocitric acid or carbohydrate or both these materials, separating cells from the medium, adding them to an aqueous solution containing L-isocitric acid and/or isocitric acid lactone, converting said acid or lactone to citric acid by incubation, and recovering the resulting citric acid.

This invention relates to a process for producing citric acid and more particularly to a process for producing citric acid, which comprises culturing a microorganism belonging to the genus Aerobacter, Pseudomonas, Micrococcus or Bacillus in a medium containing L-isocitric acid as a main carbon source, or culturing said microorganism in a medium containing carbohydrate or L-isocitric acid, or both these materials, adding the resulting cell bodies to an aqueous solution containing L-isocitric acid, converting L-isocitric acid to citric acid by incubation and recovering the resulting citric acid.

Heretofore, citric acid has been produced from carbohydrates by fermentation, using a mold belonging to the genus Aspergillus or the like, but recently there has been reported a process for producing citric acid from normal paraffins and accumulating it in the medium, using a yeast belonging to the genus Candida (see Nihon Nogei Kogaku Kaishi 43, page 154 (1969)).

However, a large amount of L-isocitric acid other than citric acid is by-produced in the medium in the latter case. Consequently the yield of citric acid is reduced and it is difficult to separate and purify crystals of citric acid. That is, these disadvantages are a great problem when citric acid is to be produced in a commercial scale.

It has been also well known that there are available enzymes capable of catalyzing a conversing of L-isocitric acid to citric acid. That is, the enzymes have been separated from hearts of mammals or a kind of molds, *Aspergillus niger,* and purified. There have been available reports on the study of function and mechanism of the engyme (Biochemical Journal 56 99–105 (1954) and Biochimica et Biophysica, Acta 17 139–140 (1955)). However, the teachings of the reports are far from the industry-scale process for producing citric acid.

One object of the present invention is to provide an improved process for producing L- citric acid.

Another object of the present invention is to provide a process for converting L-isocitric acid to L-critric acid by a biochemical means.

These and other objects of the present invention will become apparent from the following description and the appended claims.

As a result of various studies on an industrially advantageous process for producing citric acid, the present inventors have succeeded in converting L-isocitric acid to citric acid in high yield by culturing a microorganism belonging to the genus Aerobacter, Pseudomonas, Micrococcus, or Bacillus in a medium containing L-isocitric acid, a nitrogen source, inorganic substrances and other nutrient sources, or allowing cell bodies obtained by culturing said microorganism in a medium containing carbohydrates or L-isocitric acid or both these materials, to come in contact with an aqueous solution containing L-isocitric acid, and have accomplished the present invention on the basis of the foregoing finding.

As the microorganisms belonging to the genus Aerobacter used in the present invention, *Aerobacter aerogenes, Aerobactor cloacae,* etc. can be mentioned.

As the microorganisms belonging to the genus Pseudomonas used in the present invention, *Pseudomonas dacunhae, Pseudomonas schuylkilliensis,* etc. can be mentioned.

As the microorganisms belonging to the genus Micrococcus used in the present invention, *Micrococcus hysodeikticus, Micrococcus varians,* etc. can be mentioned.

As the microorganisms belonging to the genus Bacillus used in the present invention, *Bacillus subtilis, Bacillus cereus,* etc. can be mentioned.

So long as the microorganisms belong to any of said species, when the microorganisms are isolated from their habitat according to the conventioned procedure and identified according to the description of Bergey's Manual of Determinative Bacteriology, 7th edition (1957), any strain can be used in the present invention.

Several examples of these strains and the microbiological characteristics thereof are given below:

*Aerobacter aerogenes* IAM 1019, *Aerobacter cloacae* AHU 1343, *Pseudomonas dacunahe* IAM 1089, *Pseudomonas schuylkilliensis* 1776–K2, *Micrococcus lysodeikticus* IAM 1056 ATCC 4698, *Micrococcus varians* B–61–5, *Bacillus subtilis* B–201–7, *Bacillus cereus* B–204–2 and the like.

Microbiological characteristics of said strains:

*Aerobacter aerogenes* IAM 1019

Rods: 0.5 to 0.8 by 1.0 to 2.0 microns, singly. Not encapsulated. Non-motile. Gram-negative.

Agar colonies: Thick, white, moist, smooth, entire.

Agar slant: Abundant, thick, white, moist, glistening, spreading growth.

Broth: Turbid; pellicle; abundant sediment.

Potato: Thick, yellowish white, spreading growth with nodular outgrowths over the surface.

Gelatin stab: Thick, spreading, white opaque surface growth. No liquefaction.

Indole not produced.

Hydrogen sulfide not produced.

Nitrates reduced to nitrites.

Catalase: positive.

Litmus milk: Acid with coagulation; no peptonization.

Citric acid and salts of citric acid are utilized as sole sources of carbon.

Methyl red test negative: Voges-Proskauer tests positive.

Acid and gas from glucose, fructose, galactose, arabinose, lactose, maltose, raffinose, cellobiose, salicin, starch, glycerol, mannitol, sorbitol and inositol. Sucrose may not be fermented. Protopectin not fermented.

Aerobic, facultatively anaerobic.

*Aerobacter cloacae* AHU 1343

Rods: 0.5 to 1.0 by 1.0 to 2.0 microns, singly. Motile by means of petrichous flagella. Not encapsulated. Gram-negative.

Agar colonies: Circular, thick, opaque, entire.

Agar slant; Porcelain white, smooth, glistening, spreading growth.

Broth: Turbid; thin pellicle.

Potato: Yellowish, moist, glistening growth.

Gelatin stab: Slow liquefaction.

Indole not produced.

Hydrogen sulfide not produced.

Nitrates reduced to nitrites.

Catalase: positive.

Litmus milk: Acid; coagulation; gas; slow peptonization.

Citric acid and salts of citric acid may be utilized as sole sources of carbon.

Methyl red test negative; Voges-Proskauer tests positive.

Acid and gas from glucose, fructose, galactose, arabinose, xylose, lactose, maltose, cellobiose, raffinose, salicin, trehalose, sucrose, mannitol and sorbitol. Inulin, starch and protepectin not attacked. Glycerol fermented with no visible gas.

Aerobic, facultatively anaerobic.

*Pseudomonas schuylkilliensis* 1776–K2

Rods: Short, with rounded ends, occurring singly, in pairs and in chains. Motile with a pollar flagellum. Gram-negative.

Agar slants: Grayish, translucent growth. Medium shows greenish fluorescence.

Broth: Turbid, with delicate pellicle and blue green fluorescence. Stringy sediment.

Potato: Brownish, spreading, viscid, thick.

Gelatin stab: Slow cateriform liquefaction, with blue green fluorescence.

Litmus milk: Alkaline. Coagulated, with slow reduction of litmus; peptonized.

Indol produced.

Aerobic, facultative.

Does not grow at 35° to 36° C.

*Pseudomonas dacunhae* IAM 1089

Rods: 0.5 to 0.8 by 1.5 to 3.0 microns. Motile with one to six polar flagella. Gram—negative.

Agar colonies: Circular to amoeboid, with flat gistening, opaque, entire.

Agar slant: Filiform, pale buff, raised, smooth, glistening, undulate.

Broth: Turbid.

Gelatin stab: No liquefaction.

Nitrates not reduced to nitrites.

Starch not hydrolyzed.

Attacks phenol.

No acid from carbohydrate media.

Aerobic, facultative.

Grows at 37° C.

*Micrococcus lysodeikticus* IAM 1056 ATCC 4698

[Please refer to Proc. Roy. Soc. London Ser. B 93:306 (1922) and Luncet 1:217 (1929)]

*Micrococcus varians* B–61–5

Spores: 0.8 to 1.0 micron in diameter, occurring singly, in pairs and in fours. Non-motile. Gram positive.

Agar colonies: Small, yellow, raised, glistening.

Agar slant: Plumose, yellow variegated growth.

Broth: Turbid, with yellow granular sediment.

Potato: Raised, dry, bright yellow, glistening growth.

Gelatin stab: Scant growth. No liquefaction.

Indol not produced.

Starch not hydrolyzed.

Litmus milk: Acid-coagulated on boiling.

Nitrates reduced to nitrites.

Utilizes $NH_4H_2PO_4$ as a source of nitrogen.

Acid from glucose, lactose, sucrose and raffinose. No acid from solicin or inulin.

Aerobic.

*Bacillus subtilis* B–201–7

Rods: 0.7 to 0.8 by 2.0 to 3.0 microns, not in chains, uniformly stained. Not encapsulated. Motile.

Gram—positive.

Spores: 0.6 to .09 by 1.0 to 1.5 microns, ellipsoidal, central or paracentral. Thin walled. Sporangia not definitely swollen.

Agar colonies: Rough, opaque, whitish, sprending.

Glucose agar slants: Growth heavier and softer than on agar.

Broth: Clear with heavy, wrinkled, tough pellicle.

NaCl broth: Good growth up to a concentration of 7% NaCl.

Potato: Growth heavy, wrinkled to coarsely folded, spreading. Offwhite.

Gelatin stab: Liquefaction crateriform to stratiform.

Nitrates reduced to nitrites. No gas produced from nitrate broth in anaerobic conditions.

Starch hydrolysed.

Catalase: positive.

Litmus milk slowly peptonized.

Citrate utilized.

Acid but no gas from arabinose, xylose, glucose, sucrose and mannitol.

Acetylmethylcarbinol produced.

pH of glucose broth cultures is 5.0 to 8.6 in 7 days.

Good growth at 28° C. to 40° C., maximum temperature for growth 50° C.

Aerobic. Growth scant in glucose broth under anaerobic conditions; pH of 14 day culture is 5.5 or higher.

*Bacillus cereus* B–204–2

Rods: 1.0 to 1.2 by 3.0 to 4.0 microns, singly or short to long chain. Ends square. Not encapsuleted. Motile. When highly stained, protoplasm granular or foamy. Gram-positive.

On glucose agar, rods are larger and more vacuolated.

Spores: 1.0 to 1.5 microns, ellipsoidal, central or paracentral. Thin walled. Sporangia not appreciably swollen.

Agar colonies: Large, irregular, flat, rough.

Agar slants: Growth abundant, opaque; whitish, non-adherent, spreading.

Glucose agar slants: Growth abundant, heavier and softer than on agar.

Glucose nitrate agar slant: No growth.

Broth: Pellicle; fluid turbid; sediment.

Potato: Growth abundant, spreading, soft, creamy-white.

Gelatin stab: Rapid liquefaction.

Nitrates reduced to nitrites.

Starch hydrolyzed.

Catalase: positive.

Litmus milk peptonized.

Citrate utilized.

Acid but no gas is produced from glucose, sucrose and glycerol. No acid or gas from arabinose, xylose, mannitol and lactose.

Acetyl methylcarbinol produced.

Good growth at 25 to 37° C., maximum temperature for growth 45° C.; minimum temperature for growth 15° C.

Aerobic, facultatively anaerobic. Growth in glucose broth under anaerobic conditions; pH usually below 5.2.

It is needless to say that other strains than the above-mentioned can be used in the present invention, that is, the present invention is not limited to the above-mention strains. The term "IAM" is an abbreviation of Institute of Applied Microbiology, Tokyo University and the figure are an accession number of the strain. Among the above-mentioned strains, *Aerobacter aerogenes* IAM 1019 and *Bacillus subtilis* B–201–7 mere deposited under the accession numbers ATCC 21609 and ATCC 21610, respectively at The American Type Culture Collection, USA.

As the isocitric acid for the carbon source of the present invention, L-isocitric acid in a syrup state, L-isocitric acid lactone (crystals), and unpurified raw materials, for example, a waste liquor from citric acid fermentation, which contains much L-isocitric acid can be used. Particularly, a waste liquor obtained when citric acid is produced from normal paraffins using a yeast can be used.

As the nitrogen source, ammonium nitrate, ammonium chloride, urea, ammonium sulfate, ammonium carbonate, ammonium phosphate, or ammonium acetate can be used. Further, the necessary inorganic salts and organic nutrient sources are added thereto. As the organic nutrient source, yeast extract, peptone, cornsteep liquor, meat extract, etc. can be used.

It is not always necessary to carry out the ferementation under an aerobic culturing condition. An optimum culturing temperature is about 20° to 40° C. Further, an aerobis condition is not always necessary for conversion of L-isocitric acid to citric acid by resting cell bodies. Furthermore, it is desirable to keep a pH at about 4.5–10. When the fermentation starts, the pH tends to increase, and therefore neutralization is effected with an acid, for example, hydrochloric acid or isocitric acid. Fermentation is usually continued for 1 to 3 days, whereby a considerable amount of citric acid is accumulated in the fermentation liquor. After the completion of the fermentation, citric acid is isolated from the fermentation liquor as calcium citrate, as shown in Example 1, and citric acid is recovered from calcium citrate according to the conventional procedure.

Now, the present invention will be explained in detail, referring to examples.

EXAMPLE 1

Seen microorganisms obtained by culturing *Aerobacter aerogenes* IAM 1019 in a bouillon-agar slant culture medium at 30° C. for 24 hours was used. 50 ml. each of a fermentation medium having the following composition was poured in Sakaguchi flasks having capacities each of 500 ml., and used after the sterilization.

| | Percent |
|---|---|
| L-isocitric acid lactone | 5 |
| Urea | 0.2 |
| Monopotassium phosphate | 0.1 |
| Magnesium sulphate·7H$_2$O | 0.1 |
| Cornsteep liquor | 0.05 |

pH was adjusted to 6.5 with caustic soda. After the sterilization at 120° C. for 10 minutes, one loopful of said seed microorganisms was inoculated into the fermentation medium. During culturing, pH was maintained at 5–8 by properly adding hydrochloric acid thereto. The culturing temperature was 30° C., and the culturing was carried out under shaking, using a reciprocating-type shaking fermentor.

Result of analysis during the culturing is shown in Table 1.

TABLE 1

| Culturing period | pH | Citric acid yield (mg./ml.) |
|---|---|---|
| 1 day | 6.0 | 3.6 |
| 2 days | 6.5 | 15.3 |

To 1l. of the fermentation liquor obtained by culturing at 30° C. for two days was added 16.0 g. of CaCl$_2$·2H$_2$O, and the resulting solution was adjusted to pH 4.0 with hydrochloric acid, and then heated to 100° C. for 30 minutes, whereby precipitate of calcium citrate was obtained. By sulfur acid decomposition of the precipitate according to the conventional procedure, 12.0 g. of citric acid crystals were obtained.

EXAMPLE 2

Culturing was carried out for three days in the same manner as in Example 1, using the source fermentation medium as used in Example 1, except that L-isocitric acid lactone was replaced with a waste liquor from citric acid fermentation, rich in L-isocitric acid, which contained 0.5% L-isocitric acid and 0.8% citric acid. Analysis revealed that the fermentaton liquor obtained by culturing for 3 days contained 25.8 mg./ml. of citric acid.

EXAMPLE 3

Resting cell bodies obtained by culturing *Aerobacter Aerogenes* IAM 1019 at 30° C. for 24 hours in 100 ml. each of 2% bouillon liquor poured in Sakaguchi flasks having capacities each of 500 ml., using a shaking fermentor, were employed. The composition of a reacting solution was 10% L-isocitric acid and 0.5% of resting cell bodies. pH was adjusted to 6.5 with calcium hydroxide. Incubation was carried out at 30° C., using a shaking fermentor. Yield of citric acid after 28 hours was 35.0 mg./ml.

EXAMPLE 4

Resting cell bodies obtained by culturing *Aerobacter Aerogenes* IAM 1019 in a medium containing 2% L-isocitric acid, 0.5% yeast extract, 0.5% ammonium sulfate, 0.1% monopotassium phosphate, and 0.05% magnesium sulfate in a 500-ml. Sakaguchi flask in the same manner as in Example 3, were employed. The composition of the reacting solution was the same as in Example 3, but pH was adjusted to a 7.4 with caustic soda. Incubation was carried out at 37° C., while always stirring the reacting solution by a magnetic stirrer. Yield of citric acid after 25 hours was 93.0 mg./ml.

EXAMPLE 5

Resting cell bodies of *Pseudomonas dacunhae* IAM 1089 obtained by culturing it in a medium containing 2% glucose, 1% sodium L-isocitrate, 0.5% urea, 0.5% cornsteep liquor, 0.1% monopotassium phosphate, and 0.1% magnesium sulfate·7H$_2$O, were employed. The composition of the reacting solution was the same as in Example 3, and the reaction was carried out under an anaerobic condition. Yield of citric acid after 28 hours was 85.1 mg./ml.

EXAMPLE 6

Incubation was carried out in the same manner as in Example 5, except that *Micrococcus lysodiekticus* IAM 1056 was used as seed microorganism. Yield of citric acid after 28 hours was 88.5 mg./ml.

EXAMPLE 7

100 ml. of a sterilized liquid medium containing 6% L-isocitric acid, 0.3% glucose, 0.5% ammonium sulfate, 0.1% cornsteep liquor, 0.2% monopotassium phosphate and 0.2% sodium chloride, whose pH was adjusted to 6.5 with potassium hydroxide was poured into a 500-ml. Sakaguchi flask, and one loopful of *Bacillus subtilis* B–201–7 ATCC obtained by culturing it at 30° C. for 24 hours in a 2% bouillon-agar slant culture medium in advance, was inoculated into the liquid medium. Incubation was carried out at 30° C. for 39 hours. Yield of citric acid was 58.6 mg./ml.

As explained above, about 90% of isocitric acid by-produced when citric acid is produced from normal paraffins using an yeast can be converted to citric acid according to the present invention. In other words, yield of citric acid from the normal paraffins can be about 40 to 50% increased by carrying out the present invention.

What is claimed is:
1. A process for producing citric acid, which comprises culturing a microorganism belonging to the genus *Aerobacter, Pseudomonas, Micrococcus* or *Bacillus* in a culture medium containing L-isocitric acid or isocitric acid lactone as a main carbon source or allowing cell bodies of said microorganism obtained by culturing said microorganism in a culture medium containing carbohydrate, L-isocitric acid or isocitric acid lactone or a mixture thereof to come in contact with an aqueous solution of L-isocitric acid or isocitric acid lactone, converting L-isocitric acid or isocitric acid lactone to citric acid by incubation in the resultant reacting solution and recovering the resulting citric acid therefrom.

2. A process for producing citric acid according to claim 1, wherein the microorganism is *Aerobacter aerogenes, Aerobacter cloacae, Pseudomonas dacunhae, Pseudomonas schuylkilliensis, Micrococcus lysodeikticus, Micrococcus varians, Bacillus subtilis* or *Bacillus cereus.*

3. A process for producing citric acid according to claim 1, wherein the microorganism is *Aerobacter aerogenes* IAM 1019 ATCC 21609, *Pseudomonas dacunhae* IAM 1089, *Micrococcus lysodeikticus,* IAM 1056 and *Bacillus subtilis* B–201–7 ATCC 21610.

4. A process for producing citric acid according to claim 1, wherein the culture medium or the reacting solution is kept at a pH of 4.5–10 during the culturing or incubation.

5. A process for producing citric acid according to claim 1, wherein the reacting solution is a waste liquor from citric acid fermentation containing L-isocitric acid.

6. A process for producing citric acid according to claim 1, wherein the culturing or incubation is carried out at 20°–40° C.

7. A process for producing citric acid according to claim 1, wherein the microorganism is *Aerobacter areogenes.*

8. A process for producing citric acid according to claim 1, wherein the microorganism is *Aerobacter cloacae.*

9. A process for producing citric acid according to claim 1, wherein the microorganism is *Pseudomonas dacunhae.*

10. A process for producing citric acid according to claim 1, wherein the microorganism is *Pseudomonas schuylkilliensis.*

11. A process for producing citric acid according to claim 1, wherein the microorganism is *Micrococcus lysodeikticus.*

12. A process for producing citric acid according to claim 1, wherein the microorganism is *Micrococcus varians.*

13. A process for producing citric acid according to claim 1, wherein the microorganism is *Bacillus subtilis.*

14. A process for producing citric acid according to claim 1, wherein the microorganism is *Bacillus cereus.*

15. A process of claim 1, wherein the microorganism belongs to the genus *Aerobacter.*

16. A process of claim 1, wherein the microorganism belongs to the genus *Pseudomonas.*

17. A process of claim 1, wherein the microorganism belongs to the genus *Micrococcus.*

18. A process of claim 1, wherein the microorganism belongs to the genus *Bacillus.*

References Cited

Nauze, J. M.: J. Gen. Microbiol, vol. 44, pp. 73–81, 1966.

Neilson, N. E.: Biochem et Biophys Acta, vol. 17, pp. 139–140, 1955.

Ramos et al.: Nature, vol. 193, pp. 70–71, 1962.

A. LOUIS MONACELL, Primary Examiner

G. M. NATH, Assistant Examiner

U.S. Cl. X.R.

195—37

UNITED STATES PATENT OFFICE
CERTIFICATE OF CORRECTION

Patent No. 3,732,145 Dated May 8, 1973

Inventor(s) Oomori, et al

It is certified that error appears in the above-identified patent and that said Letters Patent are hereby corrected as shown below:

Column 1,
line 57, change "engyme" to --enzyme--.
line 62, change "L-citric" to --citric--.
line 64, change "L-critric" to --citric--.

Column 2,
line 18, change "hyso" to --lyso--.
line 25, change "conventioned" to --conventional--.
line 32, change "dacunahe" to --dacunhae--.
line 67, change "petrichous" to --peritrichous--.

Column 3,
line 74, change "solicin" to --salicin--.

Column 4,
line 8, change "sprending" to --spreading--.
line 72, change "are" to --is--.
line 74, change "mere" to --were--.

Column 5,
line 21, change "aerobis" tp --aerobic--.
line 39, change "Seen" to --Seed--.
line 73, change "sulfur" to --sulfuric--.

Column 6,
line 3, change "source" to --same--.
line 48, change "lysodiekticus" to --lysodeikticus--.

Signed and sealed this 5th day of February 1974.

(SEAL)
Attest:

EDWARD M. FLETCHER, JR.
Attesting Officer

RENE D. TEGTMEYER
Acting Commissioner of Patents